Jan. 9, 1945.  W. TYDON  2,366,883
MULTIPLE CONTROL VALVE
Filed Nov. 12, 1941
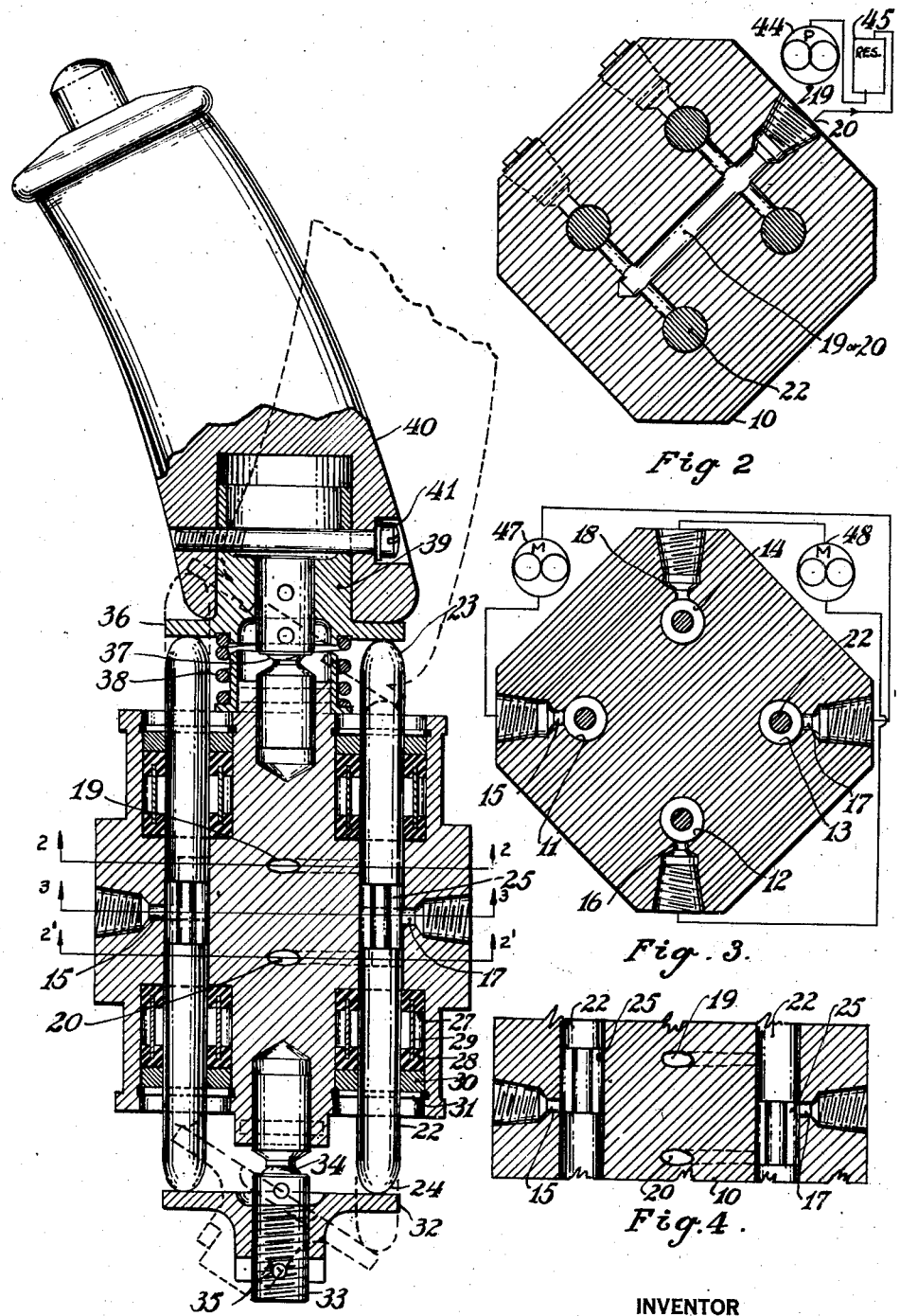
Fig. 1.  Fig. 2.  Fig. 3.  Fig. 4.
INVENTOR
WALTER TYDON
BY 
ATTORNEY Patented Jan. 9, 1945

2,366,883

UNITED STATES PATENT OFFICE 2,366,883

MULTIPLE CONTROL VALVE

Walter Tydon, Kenmore, N. Y., assignor to Curtiss-Wright Corporation, a corporation of Delaware Application November 12, 1941, Serial No. 418,641

6 Claims. (Cl. 137—144)

This invention relates to valves, and is concerned particularly with improvements in multiple hydraulic control valves having a unitary operating member for all of them.

In general, the valve unit of the invention is adapted to control the operation of one or more reversible hydraulic motors fed from a single pressure supply system. It affords sensitive simultaneous control of the speed of several hydraulic motors, being particularly suitable for use in high pressure hydraulic systems as used in aircraft, for operation of aircraft controls and various forms of hydraulically operated gun mounts. An appropriate use for the valve is shown in copending Blaylock application, Serial No. 418,686, filed November 12, 1941.

An object of the invention is to provide a single control member universally movable to control the operation of a plurality of hydraulic valves, either singly or jointly as desired. A further object is to provide a unit valve assembly having a single control member adapted to control the operation of a plurality of hydraulic motor devices, and an associated object is to provide a unitary valve assembly for controlling a plurality of reversible hydraulic motors, as desired, singly or jointly, for forward or reverse operation at any speed and in either direction.

Other objects include the provision of a multiple valve unit having a minimum number of parts, which is simple in construction and easy to produce, while being capable of sustaining high hydraulic pressure without leakage.

Further objects will become apparent in reading the annexed detailed description in connection with the drawing, in which:

Fig. 1 is a longitudinal section through the valve;

Fig. 2 is a section on either the line 2—2 or 2'—2' of Fig. 1;

Fig. 3 is a section on the line 3—3 of Fig. 1; and

Fig. 4 is a fragmentary section, similar to a portion of Fig. 1, showing the valves in a different position of adjustment.

The valve assembly includes a housing 10 generally formed as an elongated square block. Four parallel bores 11, 12, 13, and 14 are drilled lengthwise through the block, the axes of these bores being disposed at the corners of a square. Each bore, centrally of its length (in the plane 3—3 of Fig. 1), is provided with a motor port, numbered respectively 15, 16, 17, and 18, while above and below the plane 3—3, at planes 2—2 and 2'—2', inlet and outlet passages 19 and 20 are formed in the housing which are branched as ports to communicate with the several bores in said planes.

In each bore is an axially slidable plunger 22 rounded at its ends and protruding above and below the top and bottom of the housing as at 23 and 24 respectively. Centrally of each plunger is a circumferential groove 25 whose axial length is such that, when the plunger is central, the inlet and outlet ports 19 and 20 are blocked off from the associated motor port. When a plunger is raised, the inlet port 19 is placed in communication with one of the motor ports through the groove 25; while when a plunger is lowered, the outlet port 20 is placed in communication with one of the motor ports.

The upper and lower ends of the several bores 11 to 14 are counterbored to receive ring packings 27 and 28 which face one another and are separated by sleeves 29. The packings are held in the counterbores by metal rings 30 secured by spring rings 30 snapped into grooves near the counterbore ends.

At the bottom of the housing, a wabble plate 32 is screwed onto a stud 33 universally jointed on a ball 34, secured to the bottom of the housing. The wabble plate is axially adjustable along the stud, and is secured in adjusted relation by a cotter 35. At the top of the housing, a wabble plate 36 is universally movable on a ball 37 secured in the top of the housing, and a spring 38 between the housing and wabble plate urges the latter to a central position wherein its axis is parallel to the axes of the several bores. The wabble plate 36 carries a boss 39 forming a mounting for an operating handle 40 secured to the boss by a bolt 41.

Now it will be seen that the handle 40 may be tilted in any direction relative to the housing, either in the plane of the bores 11, 13 or in the plane of the bores 12, 14, or in any intermediate plane. When tilted, the wabble plates control the axial movement of the several valve plungers, adjusting opposed plungers in opposite directions.

Figs. 2 and 3 include hydraulic circuit diagrams to show how the valve assembly may function. A power driven hydraulic pump 44 delivers fluid to the passage and ports 19, while exit fluid from the passage and ports 20 passes to a reservoir 45 whose outlet connects to the pump intake. Ports 15 and 17 are connected to opposite sides of a reversible hydraulic motor 47, and ports 16 and 18 are connected to opposite sides of a reversible hydraulic motor 48.

When the handle 40 is moved to the right (longitudinally) as shown in dotted lines, pressure fluid passes to the port 15 and thence to the motor 47 to operate same in one direction, exit fluid from the motor passing to the reservoir through the port 17. Leftward movement of the handle beyond neutral reverses the motor 47. Lateral handle movement to one or the other side of neutral causes operation of the motor 48 in one or the other direction. Any combination of longitudinal or lateral movements of the handle 40 will cause appropriate combinations of forward or reverse movements of both motors 47 and 48. The degree of handle displacement from neutral controls the opening area of the fluid feed ports and thus the speed of operation of the motors, so that fine and sensitive control of the motors is afforded. When the valve is used in a power gun mount, train of the gun is effectively controlled; the circuits are preferably arranged so that forward handle movement depresses the gun, rearward handle movement elevates the gun, and leftward or rightward handle movements respectively traverse the gun to left or right. Thus gun aiming in two planes may be controlled by a single operating member, and aiming operations become more or less automatic in the same manner as an aircraft pilot's manipulation of his control stick becomes automatic in controlling the aircraft longitudinally and laterally.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a fluid control valve, a housing having a central axis and having a plurality of pairs of diametrically opposed bores about said axis, said bores being spaced an equal distance from said axis and spaced equidistantly from one another, valve plungers slidably fitted to said bores, a wabble plate universally jointed to each end of said housing on said central axis, said wabble plates engaging the ends of said plungers, a handle on one said plate universally movable in all directions transverse to said axis for manipulating said valve plungers, and fluid ports in said housing communicating with said bores.

2. In combination, a housing for a wabble plate valve having four parallel bores whose axes pass through the corners of a square, a lateral drilling communicating with each bore centrally thereof, sets of lateral passages connecting the four bores in planes spaced axially on each side of said drillings, a centrally relieved plunger in each bore whose relief is of such length as to be capable of bridging the drilling with either passage of its associated bore but having a length insufficient to bridge the passages of its associated bore, wabble members engaging the ends of the plungers universally jointed at each end of the housing, and a handle on one wabble member for rocking same for controlling the axial motion of said plungers individually and collectively.

3. In a valve assembly, a housing having four valve bores disposed about an axis, plunger type valve elements slidably fitted within each bore, each of said valve elements having an intermediate recessed portion, a motor port communicating with each bore, fluid inlet and outlet connections communicating with each bore at points spaced from and on opposite sides of the point of communication of the motor port, said valve elements each having a neutral position in which their recessed portions are out of communication with said inlet and outlet connections, each of said valve elements being movable in either direction from its neutral position to establish communication through its recessed portion between its associated motor port and either said inlet or outlet connection depending on the direction of movement, a wabble plate universally mounted on said axis at each end of the housing, each wabble plate engaging the adjacent ends of the plunger-type valve elements, and handle means on one wabble plate for manipulating said valve elements.

4. In a valve assembly, two pairs of valve elements, the valve elements of each pair having a diametrically opposed disposition, fluid inlet and fluid outlet connections to each valve element, a motor port controlled by each valve element, each valve element having a neutral position in which its associated motor port is out of communication with said fluid inlet and fluid outlet connections, each valve element being movable in either direction from said neutral position to establish communication between its associated motor port with either said fluid inlet or fluid outlet connection depending on the direction of movement, and a universally mounted control element movable in either direction along one path to oppositely move the valve elements of one pair and movable in either direction along another path to oppositely move the valve elements of the other pair, said control element being movable along intermediate paths to oppositely move the valve elements of each pair.

5. In a valve assembly, a housing having a central axis and having a plurality of pairs of diametrically opposed bores disposed about said axis, valve plungers slidably fitted to said bores, wabble plate means universally secured to said housing on said axis and operatively connected to said valve plungers, said wabble plate means being universally tiltable in all directions for manipulating said valve plungers, and fluid ports in said housing communicating with said bores for control by said valve plungers.

6. In a valve assembly, a housing having a central axis and having a plurality of pairs of diametrically opposed bores disposed about said axis and equally spaced therefrom, valve plungers slidably fitted to said bores, a wabble plate universally secured to each end of said housing on said axis, said wabble plates engaging the ends of said valve plungers, a handle fixed to one of said wabble plates and universally movable in all directions for manipulating said valve plungers, and fluid ports in said housing communicating with said bores for control by said valve plungers.

WALTER TYDON.